Sept. 6, 1960 — R. CLIBORN — 2,951,678
AERODYNAMIC OVERSPEED CONTROL FOR TURBINES
Filed May 4, 1954 — 2 Sheets-Sheet 2
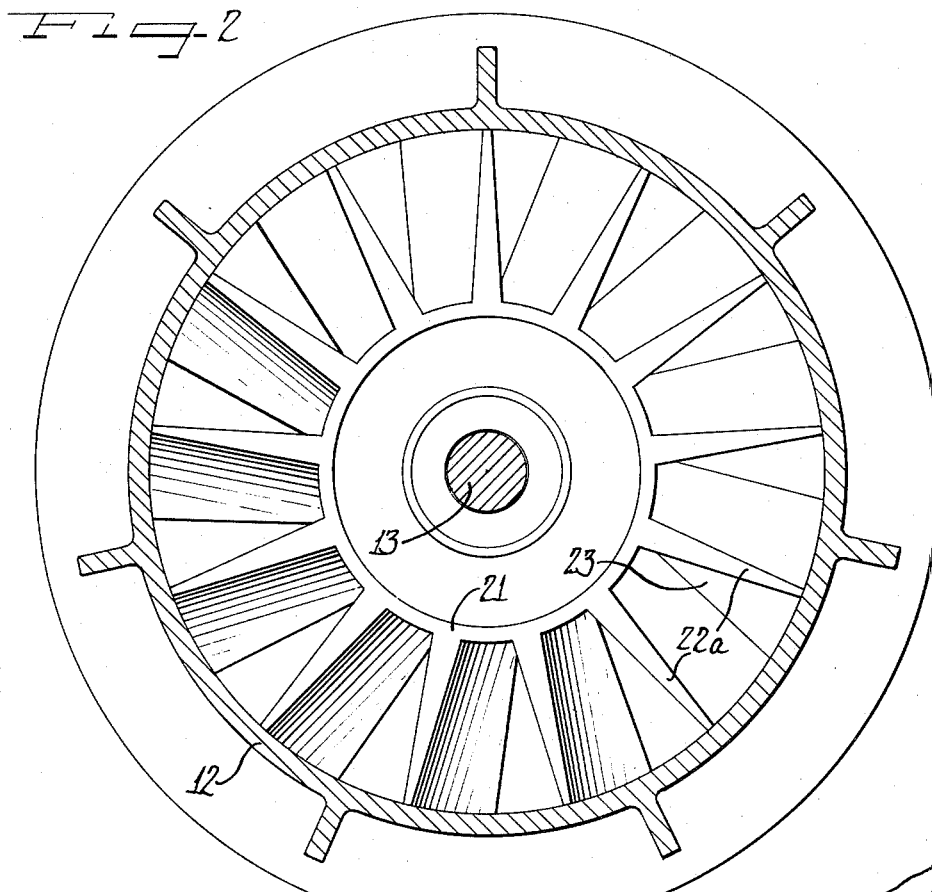
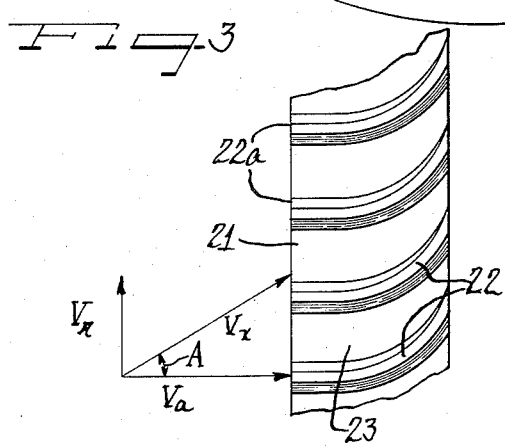
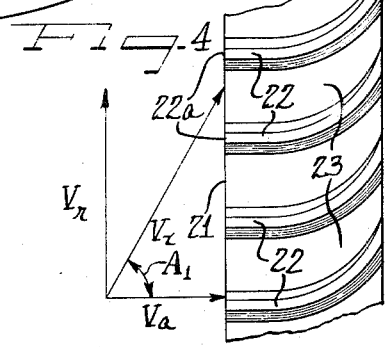
Inventor
Robert Cliborn

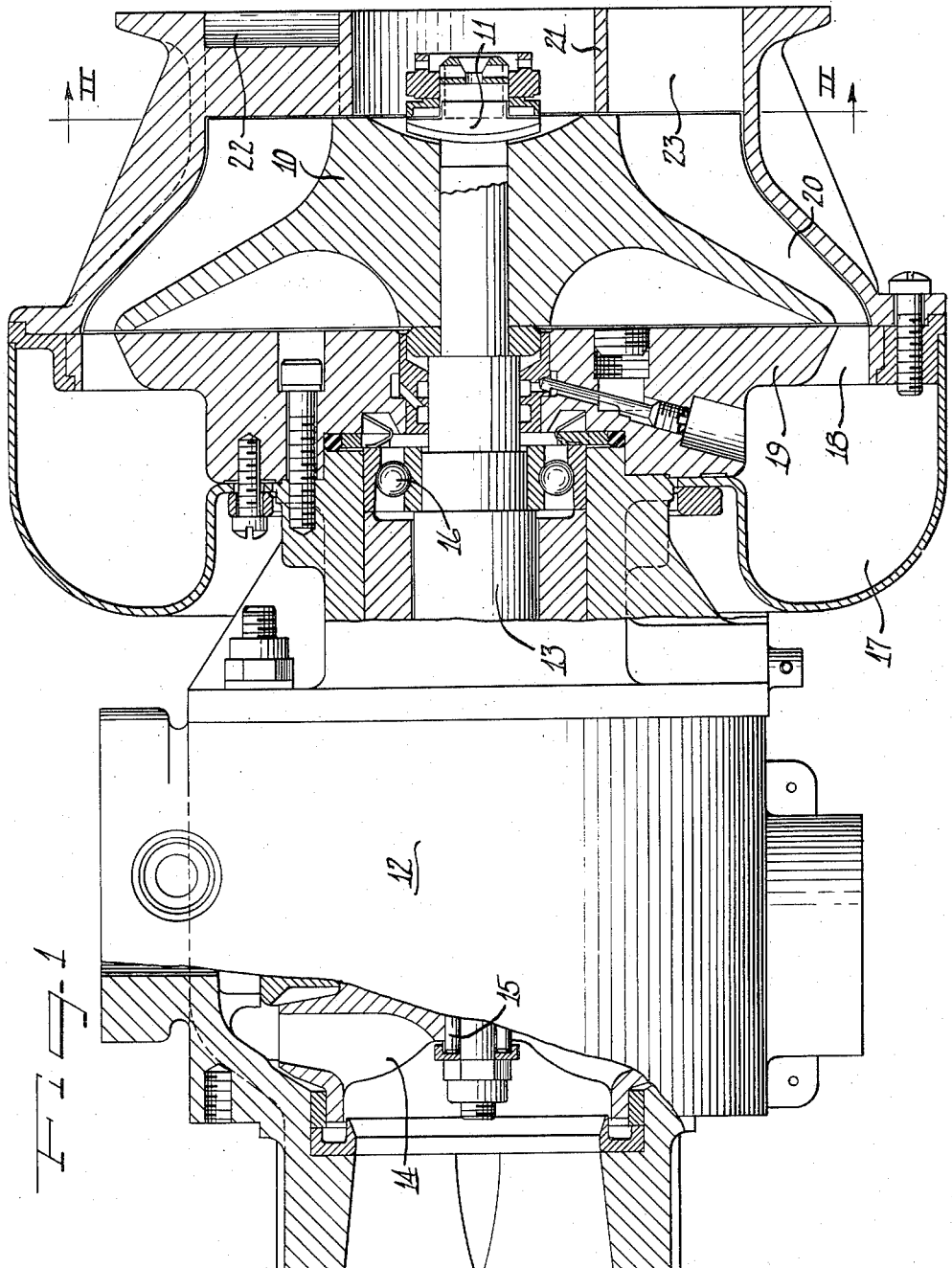

United States Patent Office 2,951,678
Patented Sept. 6, 1960

2,951,678

AERODYNAMIC OVERSPEED CONTROL FOR TURBINES

Robert Cliborn, Cleveland, Ohio, assignor to Thompson Ramo Wooldridge Inc., a corporation of Ohio Filed May 4, 1954, Ser. No. 427,638

1 Claim. (Cl. 253—59)

The present invention relates to a simplified control for turbines deriving their source of energy from a pressurized medium. More particularly, the invention relates to an overspeed control automatically operable to prevent overspeed of the turbine under excessive energy supply conditions without the use of complex throttling apparatus.

With the development of modern aircraft capable of operation at extremely high altitudes, and particularly with the development of the modern jet-type aircraft engine, problems of engine accessory operation have multiplied greatly. The source of energy for the operation of such engine accessories as fuel pumps has changed with the advent of the jet-type engine, and engine fuel pump, and other accessory, demands have also changed with the advent of higher altitude operation. The provision of efficient operation at these new operating conditions while at the same time maintaining the necessary controls at a minimum, has been a problem difficult of solution.

At the present time, it is preferred to operate accessories used with jet-type engines from compressed air derived from the jet engine compressor. The energy available from this source is very great at low levels of altitude where the atmosphere is dense, but becomes decreasingly less as the altitude of aircraft operation increases. Since aircraft must be designed for operation at very high altitudes of operation, the basic design condition is that of the highest altitude at which the aircraft is to be operated with the component parts being constructed for maximum efficiency at that operating level. For intermediate and lower levels, controls are necessary to provide the required operation.

As an illustrative example, in a fuel pump application it is necessary to provide a means for effectively shutting off the extra energy supply at low altitudes. If no controls were provided whatever, and the turbines were designed for efficient operation at high levels, it would operate far in excess of its desired speed at low levels, and would in fact, supply several times the necessary power, at an excessive speed likely to cause problems of cavitation, and vaporization in the fuel pump.

While, it is of course possible to control the source of energy through the use of a throttle upstream of the air inlet to the turbine, the use of a throttle with its attendant necessary, and highly complex, controls is very undesirable both from the standpoint of initial cost, maintenance and weight dependability. The present invention is designed to accomplish the same purpose with none of the disadvantages mentioned. It will of course be apparent from a consideration of the following description of the present invention that while it is highly useful for the purposes of control of aircraft fuel pumps and similar devices, its utility is not limited to such structures and it may of course be utilized for the control of any turbines where overspeed conditions must be prevented at a minimum of cost and weight.

In accomplishing the above mentioned purposes, the present invention utilizes an air flow choking control downstream of the turbine rotor. A stator having radially extending blades is provided for controlling the flow of air as it leaves the trailing edge of the turbine rotor blades. The stator blades are constructed to permit efficient airflow below a predetermined overspeed condition, but are such that upon attainment of the predetermined design speed, flow through the stator blades is materially constricted, thereby building up a high back pressure in the turbine preventing further increases and speed and, in effect, greatly decreasing the efficiency of the turbine to obtain energy from the excessive supply of energy available.

It is therefore an object of the present invention to provide a novel and greatly simplified turbine speed control.

Still another object of the present invention is to provide a control for turbines operating under a varying pressure head and which provides the control downstream of the turbine.

Yet another object of the present invention is to provide a novel automatically operable turbine speed control having no moving parts.

Still another object of the present invention is to provide a novel turbine speed control which controls overspeed of the turbine by varying the back pressure thereof.

Still a further object of the present invention is to provide an automatic control for the prevention of over speed conditions in accessory drive turbines used with aircraft whereby turbine efficiency is increased with continued increase in aircraft altitude.

A feature of the present invention is the provision of a stator downstream of the turbine rotor having blades capable of selectively passing or restricting airflow from the turbine, depending upon turbine inlet pressure and speed.

Still other objects and features of the present invention will at once become apparent to those skilled in the art from a consideration of the attached sheets of drawings wherein:

Figure 1 is an elevational view in partial cross-section illustrating the novel turbine control of the present invention as applied to an aircraft fuel pump;

Figure 2 is a cross-sectional view, in elevation, taken along the line II—II of Figure 1;

Figure 3 is a developed view of the blading of the novel speed control of the present device and showing by means of a vector diagram, the operation of the blading before an overspeed condition has been reached; and Figure 4 is a developed view of the stator blading in conjunction with a vector diagram illustrating the operation of the blading as an overspeed condition is reached.

As shown on the drawings:

As viewed in Figure 1, a turbine rotor 10 is angularly fixed by means of a radially extending key 11 to the rotatable shaft 13. At the opposite end of the shaft 13, a centrifugal type fuel pump 14 is positively driven by means of a splined connection 15. Any conventional means, such as, for example, ball bearings 16 may be provided for anti-frictionally mounting the shaft 13 in the combined pump and turbine housing 12.

The turbine rotor 10 is driven by compressed air, or other compressed medium, from a supply chamber 17 and which passes through the passages 18 of the nozzle plate 19 against the turbine blades 20. As the pressure in the chamber 17 increases, the energy available for operation of the turbine rotor 10 will, of course, increase, all other conditions remaining the same, and increase in turbine rotor speed will occur. In order to eliminate the need for complete throttling equipment in connection with the supply chamber 17 or the nozzle passages 18, the present invention contemplates the provision of a stator ring 21 having radially extending blades 22 and passages 23 formed thereby.

Operation of the stator ring 21 may be readily seen from a consideration of Figures 3 and 4 which illustrate blading cascades developed from the blades shown in Figures 1 and 2. In Figure 3 the path of relative movement of the air is shown by vector $V_x$, which is the resultant of the velocity $V_r$ of the rotor 10 and the velocity $V_a$, in the axial direction, of the air flow leaving the rotor blades. With the velocity of the turbine rotor at a low value, as a result of low inlet pressure or high torque requirements, the relative air movement indicated by $V_x$ lies at a relatively small angle A relative to the axial direction indicated by the vector $V_a$. In such conditions of operation, the air leaving the rotor blades 20 has no difficulty in passing through the choke ring or stator 21.

However, upon the application of an increased pressure and/or a decrease in load on the shaft 13, the vectorial quantity $V_r$ increases in the manner shown in Figure 4. As the vectorial quantity $V_r$ increases, the direction of relative movement of the air from the rotor relative to the stator 21 assumes a position somewhat as shown in Figure 4, where the angle $A_1$ has greatly increased. In this condition of operation, the air flow strikes the blades 22 at such a sharp angle of incidence that its progress through the passageways 23 is greatly impeded. Sequentially, as the rotor speed tends to increase impediment to fluid flow is increased, and a back pressure is applied to the air flow through the turbine rotor with an attendant decrease in efficiency of turbine operation and likewise with a decrease in the axial velocity $V_a$ of the air. This decrease in the value of the axial flow $V_a$ causes an additional factor causing the relative movement of the air $V_x$ to vary relative to the vectorial line $V_a$ to increase the angle $A_1$. Of course, as the angle $A_1$ increases, the efficiency of the turbine continues to decrease with a resultant tendency for the turbine to reach a definite predetermined maximum speed. Due to the fact that the choking off of the flow, and hence the increase in back pressure, causes the angle $A_1$ to increase in the same manner as an increase in $V_r$, the speed at which the turbine will operate has an effective maximum that becomes relatively critical and which may be quite accurately controlled by the point at which a back pressure begins to build up.

It will at once be apparent that the precise shape of the stator blades 22 will vary depending upon the maximum speed condition desired. By constructing the leading edges 22a of the blades more nearly parallel to the vectorial line $V_x$ shown in Figure 3, instead of generally axial, the point of back pressure build up will be materially delayed and, hence, the maximum operating speed of the turbine will be increased. Likewise, in the reverse, positioning of the leading edges 22a of the blades 22 nearly perpendicular to the vectorial line $V_x$ shown in Figure 3 will cause a back pressure to build up at an earlier value of $V_r$ with a resultant lowering of the maximum rotor velocity.

In actual practice in aircraft installations of the jet type, wherein the source of energy for causing turbine rotation is the jet power plant compressor system, it has been found that the above described turbine control is highly effective. By designing the turbine to provide the necessary pump rotational torque and speed at maximum flying altitudes, efficient operation at those levels is assured. At the same time, the novel back pressure control and hence turbine effective efficiency control of the present invention prevents the turbine from operating at extremely high speeds at low levels of aircraft operation where the energy available from the jet power plant compressors is far in excess of that at high altitudes. By use of the structure of the present invention, all throttle controls and other similar complex automatic apparatus have been eliminated from the control of the turbine while at the same time a very compact unit has been maintained.

It will of course be understood that while the invention has been described relative to one particular use, namely, for the operation of aircraft accessories, the novel turbine control herein disclosed can be used with turbines of all types that are required to be maintained at a speed range below a predetermined maximum irrespective of the source of energy. It is, therefore, not intended that the control of the present invention be limited to use in an aircraft installation or in any other particular installation. Further modification or variations may also, of course, be provided without departing from the novel concepts of the present invention and I do not intend that the scope of this application be limited other than as required by the appended claim.

I claim as my invention:

A speed control for turbines driven by energy of a pressurized fluid by means of a rotor, comprising a stator immediately downstream of said rotor, said stator having fixed generally axially extending radially directed blades thereon, each of said blades having an essentially straight surface beginning at the leading edge thereof and extending downstream therefrom a substantial distance and then curving to form concave surface facing in the direction of rotation of the rotor, said straight surface extending generally axially of said rotor for a substantial distance downstream of its leading edge for the interception of flow from said rotor, said blades being oriented to provide a small angle of incidence at the design speed of the turbine and thereby choking off the flow through the stator when the rotor achieves a velocity substantially above said design speed.

References Cited in the file of this patent

UNITED STATES PATENTS

| | | |
|---|---|---|
| 1,156,549 | Perry | Oct. 12, 1915 |
| 2,219,994 | Jung | Oct. 29, 1940 |
| 2,382,108 | Seewer | Aug. 14, 1945 |
| 2,648,492 | Stalker | Aug. 11, 1953 |
| 2,710,165 | Thomas | June 7, 1955 |

FOREIGN PATENTS

| | | |
|---|---|---|
| 6,692 | Great Britain | 1913 |
| 114,223 | Switzerland | Mar. 16, 1926 |
| 337,422 | France | Feb. 17, 1904 |
| 540,707 | Great Britain | Oct. 27, 1941 |
| 713,036 | Germany | Oct. 30, 1941 |
| 882,017 | France | Feb. 8, 1943 |
| 1,050,616 | France | Sept. 2, 1953 |